United States Patent
Zhang et al.

(10) Patent No.: US 11,089,297 B2
(45) Date of Patent: Aug. 10, 2021

(54) HISTORICAL MOTION VECTOR PREDICTION WITH RESET LIST

(71) Applicant: HULU, LLC, Santa Monica, CA (US)

(72) Inventors: Wenhao Zhang, Beijing (CN); Deliang Fu, Beijing (CN); Juncheng Ma, Beijing (CN); Chen Liu, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 16/555,961

(22) Filed: Aug. 29, 2019

(65) Prior Publication Data

US 2020/0077085 A1 Mar. 5, 2020

Related U.S. Application Data

(60) Provisional application No. 62/726,121, filed on Aug. 31, 2018.

(51) Int. Cl.
| | | |
|---|---|---|
| *H04N 19/105* | (2014.01) | |
| *H04N 19/176* | (2014.01) | |
| *H04N 19/139* | (2014.01) | |
| *H04N 19/40* | (2014.01) | |

(52) U.S. Cl.
CPC ......... *H04N 19/105* (2014.11); *H04N 19/139* (2014.11); *H04N 19/176* (2014.11); *H04N 19/40* (2014.11)

(58) Field of Classification Search
None
See application file for complete search history.

(56) References Cited

U.S. PATENT DOCUMENTS

| | | |
|---|---|---|
| 7,620,107 B2 | 11/2009 | Lee et al. |
| 2004/0091048 A1* | 5/2004 | Youn ............... H04N 19/56 375/240.16 |
| 2010/0296580 A1 | 11/2010 | Metoevi et al. |
| 2012/0320969 A1 | 12/2012 | Zheng et al. |
| 2013/0315308 A1* | 11/2013 | Sugio ............... H04N 19/159 375/240.14 |

(Continued)

FOREIGN PATENT DOCUMENTS

| | | |
|---|---|---|
| KR | 101575605 B1 | 12/2015 |
| KR | 1020160087206 A | 7/2016 |

OTHER PUBLICATIONS

Azevedo et al., "Parallel H.264 Decoding on an Embedded Multicore Processor", Proceedings of the 4th International Conference on High Performance and Embedded Architectures and Compilers—HIPEAC, Jan. 2009.*

(Continued)

*Primary Examiner* — Edemio Navas, Jr.
(74) *Attorney, Agent, or Firm* — Fountainhead Law Group, P.C.

(57) ABSTRACT

In some embodiments, a method selects a current block in a frame and determines whether the current block is in a first set of positions in the frame. When the current block is in the first set of positions: the method loads a first set of motion vectors from a first list as historical motion vector predictors, wherein the one or more motion vectors are from one or more blocks in the first set of positions in the frame; and uses the first set of motion vectors to transcode the current block. When the current block is not in the first set of positions, the method uses a second set of motion vectors from a second list.

20 Claims, 10 Drawing Sheets

(56) References Cited

U.S. PATENT DOCUMENTS

| | | | |
|---|---|---|---|
| 2014/0092978 A1* | 4/2014 | Bugdayci | H04N 19/30 375/240.16 |
| 2014/0133560 A1* | 5/2014 | Kim | H04N 19/593 375/240.12 |
| 2020/0059658 A1* | 2/2020 | Chien | H04N 19/137 |
| 2020/0077084 A1* | 3/2020 | Li | H04N 19/105 |

OTHER PUBLICATIONS

International Search Report and Written Opinion for International Application No. PCT/US2019/049232 dated Dec. 20, 2019, 9 pages.

\* cited by examiner

| 0 | 1 | 2 | 3 | 4 | 5 |
|---|---|---|---|---|---|
| 6 | 7 | 8 | 9 | 10 | 11 |
| 12 | 13 | 14 | 15 | 16 | 17 |
| 18 | 19 | 20 | 21 | 22 | 23 |

Processing order of coding blocks

FIG. 3

HISTORICAL MOTION VECTOR PREDICTION WITH RESET LIST

CROSS REFERENCE TO RELATED APPLICATIONS

Pursuant to 35 U.S.C. § 119(e), this application is entitled to and claims the benefit of the filing date of U.S. Provisional App. No. 62/726,121 filed Aug. 31, 2018, the content of which is incorporated herein by reference in its entirety for all purposes.

BACKGROUND

In a video coding framework, the video content is compressed via a set of processes: prediction, transformation, quantization, and entropy coding. One prediction method is inter prediction, which identifies a temporal redundancy between adjacent video frames. Inter prediction then aims to remove the temporal redundancy among the adjacent video frames to reduce the number of bits that are sent in an encoded bitstream. For example, only the difference between blocks in adjacent video frames needs to be sent when a temporal redundancy is identified.

To perform inter prediction, the video frames are divided into blocks and motion vector (MV) based motion compensation is applied. One part of motion compensation is selecting a motion vector. A motion vector may be a two-dimensional value that indicates an offset, such as in a two-dimensional pixel position, between a current block and its matching block in the neighboring frame. The value may include position offsets in horizontal and vertical coordinates. Motion vectors are generated by a transcoder via various motion search algorithms, and transmitted to a decoder, which uses the motion vectors in the decoding process.

BRIEF DESCRIPTION OF THE DRAWINGS

FIG. 3 depicts an example of row-by-row raster scan order for processing a current frame according to some embodiments.

DETAILED DESCRIPTION

Figure 1:
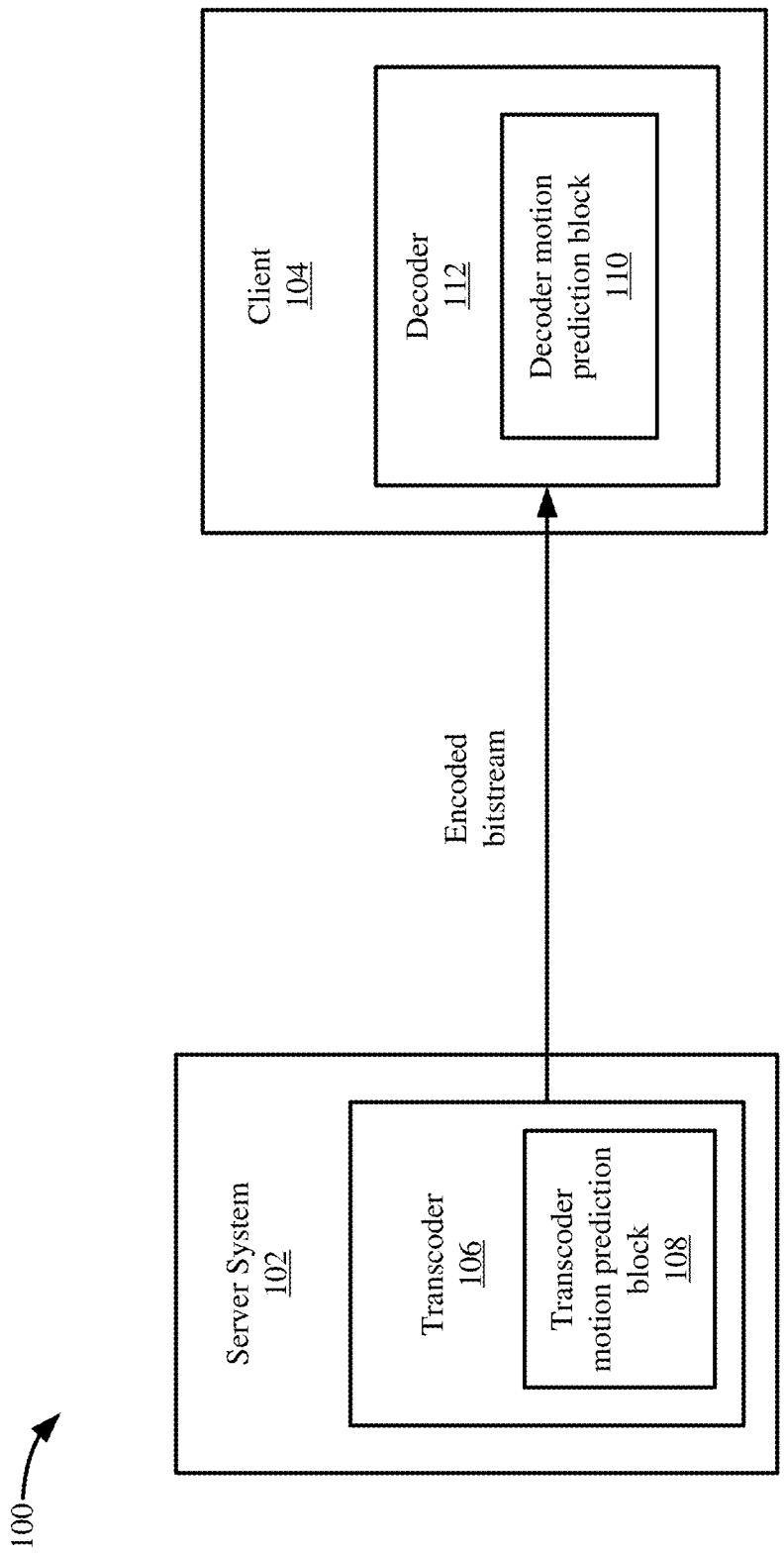
FIG. 1 depicts a simplified system for performing motion prediction according to some embodiments.

Described herein are techniques for a video coding system. In the following description, for purposes of explanation, numerous examples and specific details are set forth in order to provide a thorough understanding of some embodiments. Some embodiments as defined by the claims may include some or all of the features in these examples alone or in combination with other features described below and may further include modifications and equivalents of the features and concepts described herein.

Some methods of motion vector prediction include: spatial motion vector prediction, temporal motion vector prediction, and historical motion vector prediction. Spatial motion vector prediction uses a neighboring block's motion vector as a predictor; temporal motion vector prediction uses the block's motion vector in adjacent frames as a predictor; and historical motion vector prediction utilizes a list of previously coded motion vectors as predictors.

Motion vectors (MVs) of neighboring blocks may be similar to each other. A transcoder may use this characteristic during motion vector prediction to further reduce the overhead used to represent the motion vectors in the encoded bitstream. The transcoder may perform motion vector prediction based on the following, but other calculations may be used:

$$MV = MV\ predictor\ (MVP) + MV\ difference\ (MVD),$$

where MV is a motion vector position, a motion vector predictor (MVP) is a previously coded motion vector, and a motion vector difference (MVD) is the residual value that the transcoder transmits in the encoded bitstream. The residual value may be the changes from the motion vector predictor to the motion vector for the current block. The transcoder may encode the residual value using a number of bits that correspond to the value. As an amplitude of the value goes up, the number of bits required to encode the residual value goes up. Since the amplitude of the motion vector difference should be smaller than the original motion vector, the number of bits used in coding the motion vector can be reduced. That is, when the transcoder sends the motion vector difference instead of the original motion vector, the transcoder uses fewer bits in the encoded bitstream.

Some embodiments enhance the historical motion vector prediction process by using an additional list that is referred to as a reset list during a transcoding process. The transcoder may use the reset list when transcoding certain blocks in a frame, such as blocks at the beginning of each coding block row. The transcoder may use a dual-buffer model to implement the process. For example, the transcoder uses a reset buffer to store historical motion vector predictors from blocks at the beginning of each coding block row. The transcoder inserts these historical motion vector predictors into a historical motion vector predictor buffer when the transcoder is coding blocks at the beginning of each coding block row. The inserted historical motion vector predictors may be more similar to motion vectors for blocks at the beginning of each row as will be described in more detail below. The use of more similar historical motion vector predictors may enhance the historical motion vector prediction by increasing the accuracy of motion vector prediction, especially at the beginning of each coding block row. Finally, the compression performance of the transcoder can be improved by inserting fewer bits in the encoded bitstream because historical motion vector prediction is more effective.

System Overview

FIG. 1 depicts a simplified system 100 for performing motion prediction according to some embodiments. System 100 transcodes a source video asset, which may be any type of video, such as for a television show, movie, or video clip. The source video may need to be transcoded into one or more formats, such as formats at one or more bitrates. In some embodiments, a server system 102 sends an encoded bitstream to client 104. For example, server system 102 may be sending a video to a client 104 for playback.

Server system 102 includes a transcoder 106 that transcodes a video into an encoded bitstream. Transcoder 106 may be a software video processor/transcoder configured on a central processing unit (CPU), a hardware accelerated video processor/transcoder with a graphical processing unit (GPU), a field programmable gate array (FPGA), and/or a hardware processor/transcoder implemented in an application-specific integrated circuit (ASIC). Transcoding may be the conversion from one digital format to another digital format. Transcoding may involve decoding the source format and encoding the source video into another digital format, or converting the source content into videos with a specific resolution, framerate, bitrate, codec, etc. Also, encoding may be the conversion of analog source content and to a digital format. As used, the term transcoding may include encoding.

During the transcoding process, a transcoder motion prediction block 108 performs motion prediction for a current block of a current frame. During motion prediction, transcoder motion prediction block 108 may generate and use a reset list when transcoding a current block, which will be described in more detail below.

Transcoder 106 transmits the resulting encoded bitstream to decoder 112 over a network or other types of communication media. Decoder 112 receives the encoded bitstream and a decoder motion prediction block 110 performs motion prediction during the decoding process. During motion prediction, decoder motion prediction block 110 may generate and use a list of historical motion predictions when performing decoding, which will be described in more detail below. Given a coding block, decoder motion prediction block 110 will select a motion vector predictor from the list and receive the motion vector difference from bitstream. For example, decoder motion prediction block 110 adds the difference to a motion vector predictor to generate the motion vector for a current block. To make sure the transcoder 106 and decoder 110 work in consistent way and generate identical video, the following description of process is applied to both transcoder 106 and decoder 110.

Historical Motion Vector Prediction

Figure 2:
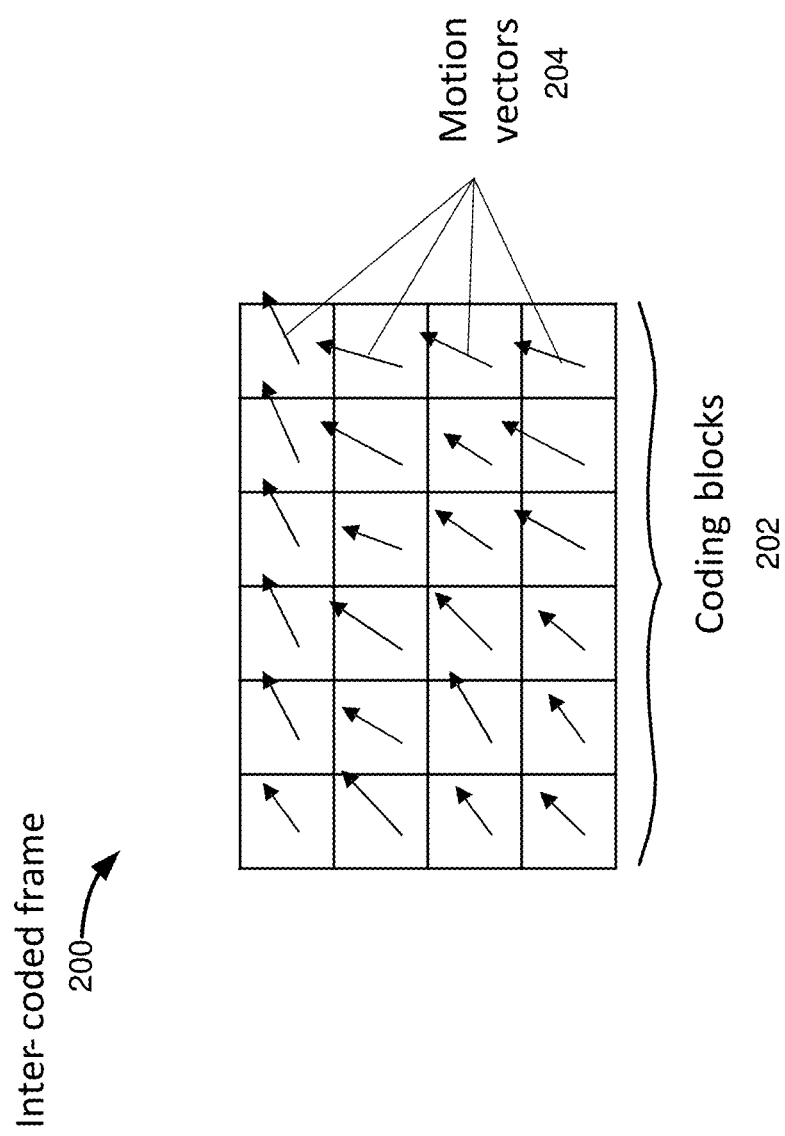
FIG. 2 depicts an inter-coded frame with coding blocks according to some embodiments.

FIG. 2 depicts an inter-coded frame 200 with coding blocks 202 according to some embodiments. Each coding block 202 may have one or more motion vectors 204 that point to a position in another frame. That is, the arrows in FIG. 2 are motion vectors and point to a position in another frame in the video (not shown). Although one arrow is shown per block, each block may include multiple motion vectors.

Historical motion vector prediction maintains a first buffer, such as first-in-first-out (FIFO) buffer, with a list to store the historical motion vector predictors (HMVPs), which can be used as the motion vector predictor candidates of a current coding block. FIG. 3 depicts an example of a row-by-row raster scan order for processing a current frame according to some embodiments. The processing order shown starts with block 0 at 302 and transcoder motion prediction block 108 processes coding blocks 1, 2, . . . . , to block 23 at 304. Transcoder motion prediction block 108 may process the coding blocks sequentially. Although this scan order is described, other scan orders may be appreciated.

In a raster scan, transcoder motion prediction block 108 sub-divides an image into a sequence of rows that sweep left to right in a direction, such as horizontally. When coding a block, transcoder motion prediction block 108 may use the previous motion vectors from blocks that have been already coded in the motion prediction process. Using block #16 as the current coding block, transcoder motion prediction block 108 has coded the previous blocks #0 to #15 and transcoder motion prediction block 108 has stored the corresponding motion vectors. Transcoder motion prediction block 108 can use these motion vectors as historical motion vector predictors for block #16. However, in practical use, transcoder motion prediction block 108 cannot store all of the corresponding motion vectors for previously coded blocks. For example, transcoder motion prediction block 108 may have storage limits that prevent all of the previous motion vectors for the previously coded blocks to be stored.

Figure 4:
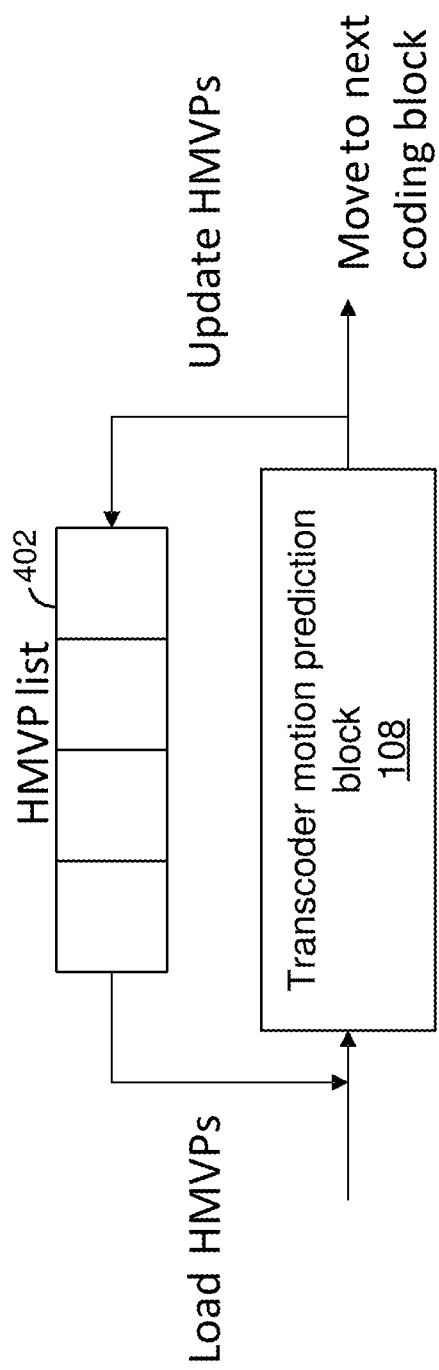
FIG. 4 depicts an example of a transcoder motion prediction block when using historical motion vector prediction according to some embodiments.

The following will describe the above limits in more detail. FIG. 4 depicts an example of transcoder motion prediction block 108 when using historical motion vector prediction according to some embodiments. When transcoder motion prediction block 108 processes a current coding block C, transcoder motion prediction block 108 loads the historical motion vector predictor candidates from a historical motion vector predictor list storage 402 (e.g., buffer). Transcoder motion prediction block 108 uses the historical motion vector predictors as possible motion vector predictors during the transcoding process of the current block C. That is, transcoder motion prediction block 108 may select one of the historical motion vector predictors, such as a historical motion vector predictor that is closest in value to the current motion vector for the current block. Then, transcoder motion prediction block 108 calculates the motion vector difference between the historical motion vector predictor and the current motion vector.

When the process of coding the block is finished, the transcoder motion prediction block 108 stores the resulting motion vector into historical motion vector predictor list storage 402 to update the historical motion vector predictor list. The size of historical motion vector predictor list may be always fixed; thus, when transcoder motion prediction block 108 adds new motion vector predictors to the historical motion vector predictor list, the older motion vector predictors may be removed, such as the oldest, if a FIFO buffer is full. The choice of the list size is a tradeoff factor between complexity and coding efficiency. A larger historical motion vector predictor list requires more memory and is more complex to maintain, but may improve the coding efficiency because the probability that the best motion vector predictor exists in the historical motion vector predictor list will be higher. However, a smaller list will be easier to maintain and take less time to search. In some cases, the historical motion vector predictor list size is equal to between four and ten motion vectors.

Figure 5:
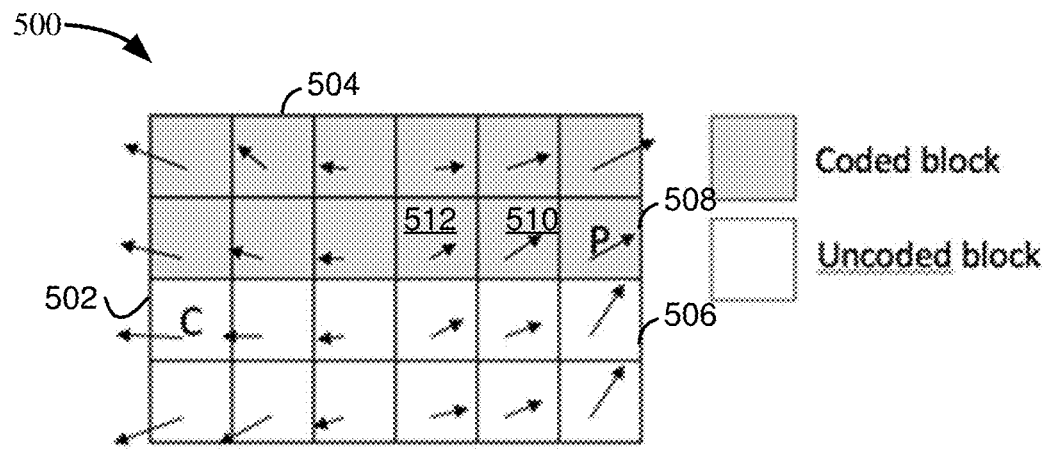
FIG. 5 illustrates an example of a problem when coding a current block C.

Using only a single historical motion vector predictor list may not be efficient under certain cases, such as when coding the first N blocks of each coding block row. FIG. 5 illustrates an example of a problem when coding a current block C at 502. A frame 500 includes blocks that have been coded previously at 504 (shaded blocks) and blocks that have not been coded yet at 506. Although the first block of a row is discussed, the first N blocks of a row may experience a similar problem. However, the first block may not have a left-hand neighbor so the use of the reset list may be more beneficial for the first block of a row compared to the second block of a row from the left-hand side. That is, the second block in a row has the first block as a left-hand neighbor. However, the first block is at the leftmost edge of the row and has no left-hand neighbor.

When transcoder motion prediction block 108 codes a block P at 508, motion vectors from the previous block at 510 that is adjacent to block P are available in the historical motion vector predictor list and may be similar to motion vectors for block P. This similarity would increase the coding efficiency compared to using motion vectors that may be less similar, such as from block at 512. However, when transcoder motion prediction block 108 begins to process current block C, the historical motion vector predictor list may just include motion vectors from the block P at 508 depending on the size of the historical motion vector predictor list. For example, the block P may have had ten motion vectors that were stored in the historical motion vector predictor list, which caused all other motion vectors to be removed from the historical motion vector predictor list. Due to the spatial distance between block C and block P being large (e.g., block C is on the left-side of the image and block P is on the right-side of the image), there may be a high chance that the motion of block C and block P are totally independent. This might be different if the blocks were next to each other. Considering the positions of block C and block P, the motion vectors in the historical motion vector predictor list may not be relevant to the current block C. That is, if the historical motion vector predictor list size is not large enough, there may no usable historical motion vector predictors candidates in the historical motion vector predictor list for current block C. As a result, the motion prediction accuracy for the blocks in the first coding block column in the frame is lower than other blocks in frame 500, and the compression efficiency of blocks in this region may be worse.

To address the above-mentioned problem, transcoder motion prediction block 108 uses a reset list to reset the historical motion vector predictor list when processing some blocks in an area of a frame, such as the left side of the frame. For example, transcoder motion prediction block 108 uses a dual-list storage model that includes a regular historical motion vector predictor list and a reset list. The regular historical motion vector predictor list is the list that is retrieved during transcoding of a current block and updated after the processing of a coding block as discussed above. The reset list stores the motion vectors from N blocks at the left side of the frame that were previously coded for use when blocks on the left side of the frame are currently being coded.

Historical Motion Vector Prediction Using a Reset List

Figure 6:
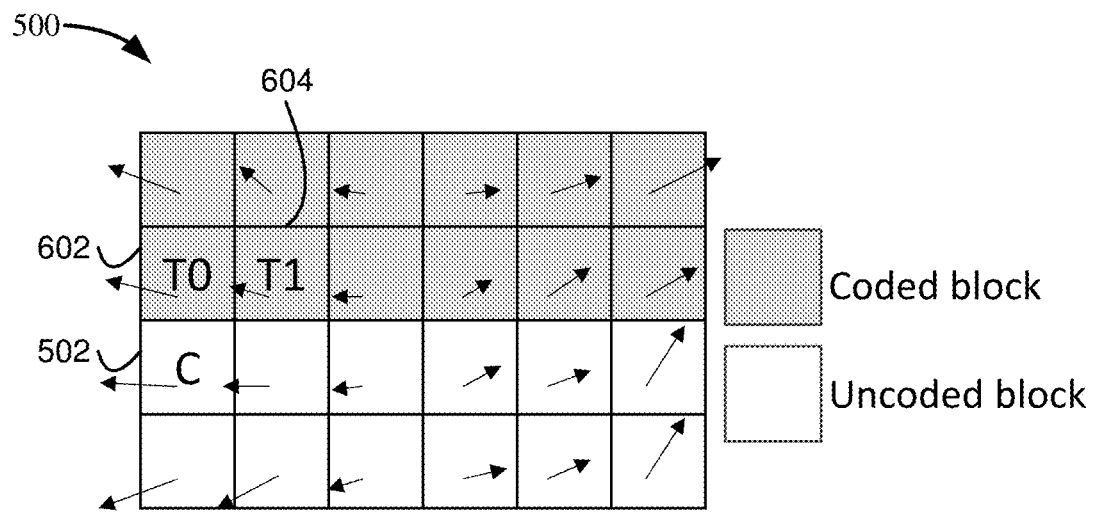
FIG. 6 depicts an example of transcoding a frame when using the reset list according to some embodiments.

FIG. 6 depicts an example of transcoding frame 500 when using the reset list according to some embodiments. In each coding block row, after the first N coding blocks (e.g., T0, T1, . . . , TN) are processed from the left hand side of the row, transcoder motion prediction block 108 copies and stores at least a portion of the entries in regular historical motion vector predictor list from the first N coding blocks into a reset list.

Then, later on in the coding process, when transcoder motion prediction block 108 is coding a block at the beginning of each coding block row, e.g., at a coding unit C at 502, transcoder motion prediction block 108 may copy and store at least some entries in the reset list into the regular historical motion vector predictor list. For example, transcoder motion prediction block 108 copies motion vectors from a block T0 at 602 and a block T1 at 604 up to a block TN from the reset list into the regular historical motion vector predictor list. Then, the blocks in the first coding block column in frame 500 can use motion vectors from the top neighboring blocks to perform historical motion vector prediction. The motion vectors from the top neighboring blocks may be more similar to a motion vector of the current block C at 502 compared to motion vectors from the blocks at the rightmost side of the frame because the top neighboring blocks are adjacent to the current block C, such as adjacent to a top edge of the current block C, or closer to the current block C compared to the right-most block in the frame. These blocks may be more likely to contain similar content compared to the right-most block or other blocks farther away from the current block C. Thus, the motion prediction accuracy and coding efficiency may increase.

Also, in some embodiments, transcoder motion prediction block 108 can store other types of motion vectors in the reset list, such as, motion vectors with a horizontal component and a vertical component equal to zero, or global motion vectors tracking the overall motion of video content, and so on. These motion vectors may be default motion vectors or predefined motion vectors. Also, transcoder motion prediction block 108 may analyze characteristics of the video and store certain motion vectors in the reset list, such as when motion is moving horizontally, transcoder motion prediction block 108 stores a horizontal motion vector in the reset list. Also, the regular historical motion vector predictor list of current block C may be initialized to have pre-defined entries, which can also improve the motion prediction accuracy.

Figure 7:
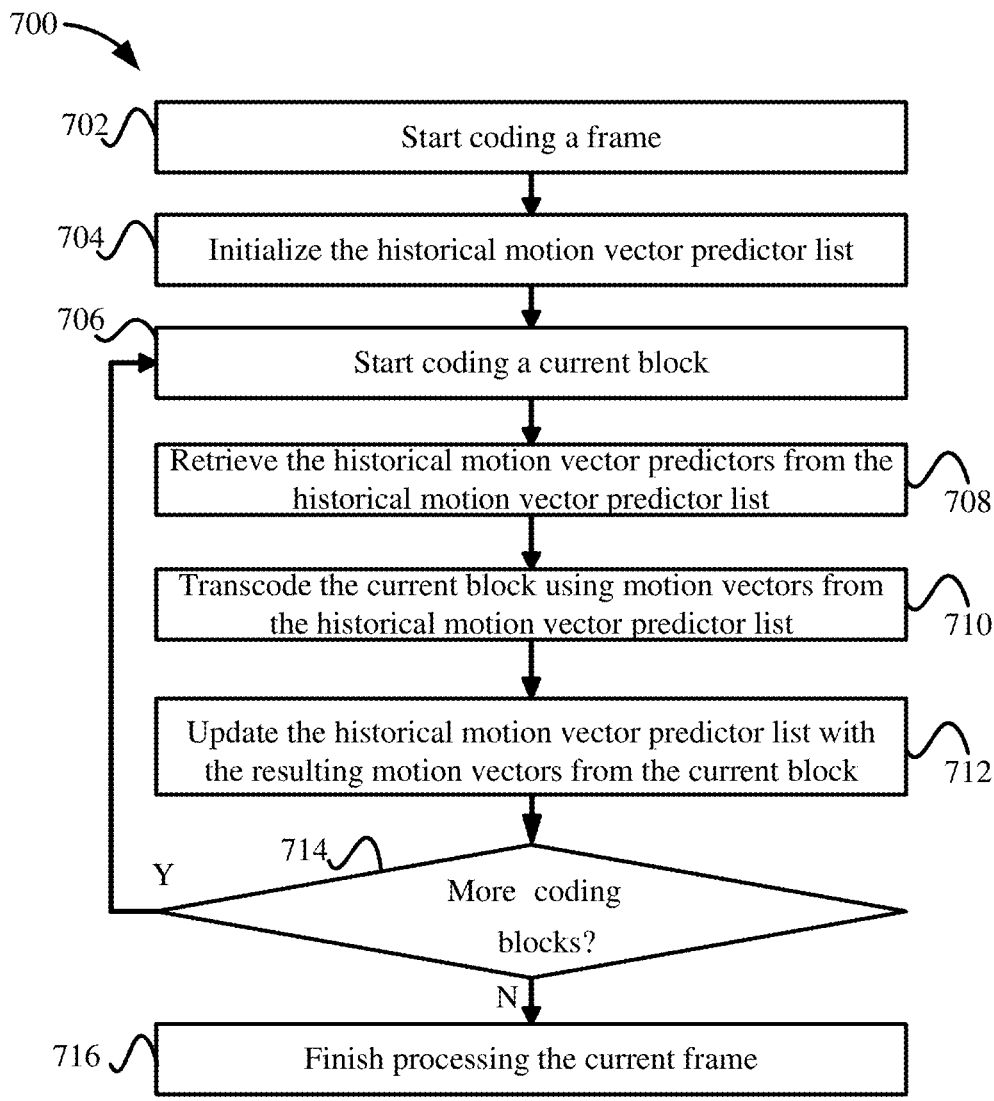
FIG. 7 depicts a simplified flowchart of the process for storing motion vectors in the historical motion vector predictor list according to some embodiments.

FIG. 7 depicts a simplified flowchart 700 of the process for storing motion vectors in the historical motion vector predictor list according to some embodiments. At 702, transcoder motion prediction block 108 starts transcoding a frame 500. At 704, transcoder motion prediction block 108 initializes the historical motion vector predictor list.

At 706, transcoder motion prediction block 108 starts coding a current block C 502. At 708, transcoder motion prediction block 108 retrieves the historical motion vector predictors from the historical motion vector predictor list. Then, at 710, transcoder motion prediction block 108 transcodes the current block using motion vectors from the historical motion vector predictor list. After transcoding the current block, at 712, transcoder motion prediction block 108 updates the historical motion vector predictor list with the resulting motion vectors from the current block. At 714, transcoder motion prediction block 108 determines if there are more blocks in the current frame to process. If so, the process reiterates to 706 to process another block. If not, at 716, transcoder motion prediction block 108 finishes processing current frame 500.

Reset List

Figure 8:
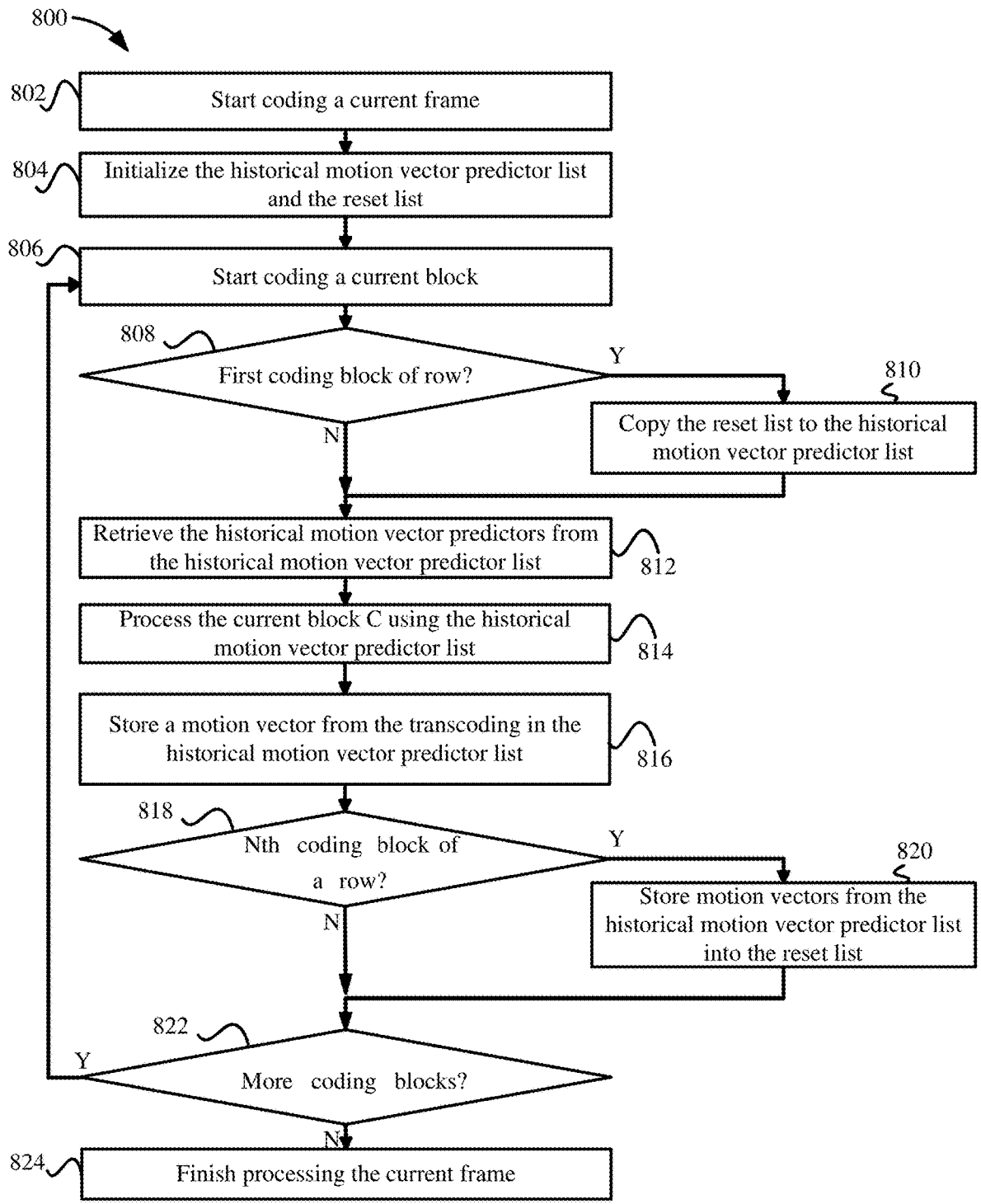
FIG. 8 depicts a simplified flowchart of a process for using the reset list to store motion vectors in the historical motion vector predictor list according to some embodiments.

Transcoder motion prediction block 108 may use the process in FIG. 7 when processing some of the blocks of current frame 500 in a first portion of current frame 500, such as blocks on the right side of current frame 500. However, when processing some blocks in a second portion of current frame 500, such as in the first column of current frame 500 or the left side of current frame 500, transcoder motion prediction block 108 uses the reset list. FIG. 8 depicts a simplified flowchart 800 of a process for using the reset list to store motion vectors in the historical motion vector predictor list according to some embodiments. At 802, transcoder motion prediction block 108 starts coding a current frame 500. At 804, transcoder motion prediction block 108 initializes the historical motion vector predictor list and the reset list.

At 806, transcoder motion prediction block 108 starts coding a current block C 502. At 808, transcoder motion prediction block 108 determines if the current block is the first block of the row (or a block in a second portion that uses the reset list). If this is the first block of the row, at 810, transcoder motion prediction block 108 copies at least a portion of the reset list to the historical motion vector predictor list. This may reset the historical motion vector predictor list. Depending on the size of the historical motion vector predictor list, all the existing motion vectors may be replaced in the historical motion vector predictor list by motion vectors from the reset list or only some of the existing motion vectors in the historical motion vector predictor list are replaced. Alternatively, transcoder motion prediction block 108 may use the reset list instead of the historical motion vector predictor list. Or, transcoder motion prediction block 108 may retrieve motion vector predictors from both lists. Then, at 812, transcoder motion prediction block 108 retrieves the historical motion vector predictors from the historical motion vector predictor list. At 814, transcoder motion prediction block 108 processes the current block C 502 using the historical motion vector predictor list.

Upon finishing the transcoding of current block C 502, transcoder motion prediction block 108 stores a motion vector from the transcoding in the historical motion vector predictor list. The motion vectors stored in the reset list are the ones from blocks on the left side of the frame. Accordingly, at 818, transcoder motion prediction block 108 determines if the current block C that has just been transcoded is one of N coding blocks from a row. If so, at 820, transcoder motion prediction block 108 stores motion vectors from the historical motion vector predictor list into the reset list. Alternatively, transcoder motion prediction block 108 stores the motion vectors from the current block C into the reset list. At 822, transcoder motion prediction block 108 determines if there are more blocks in the current frame to process. If so, the process reiterates to 806 to process another block. If not, at 824, transcoder motion prediction block 108 finishes processing current frame 500.

Accordingly, when the current block is one of the first N coding blocks of the frame, the historical motion vector predictor list includes motion vectors from other blocks on the left side of the frame. However, when the current block is not in the left N most blocks of the frame, the historical motion vector predictor list includes the typical motion vectors previously stored from the adjacent blocks. When N coding blocks from the left-hand side were transcoded, the transcoder motion prediction block 108 stores the motion vectors in the historical motion vector predictor list and also the reset list. When blocks other than the N coding blocks from the left-hand side of the row were transcoded, the transcoder motion prediction block 108 stores the motion vectors in only the historical motion vector predictor list.

Figure 9B:
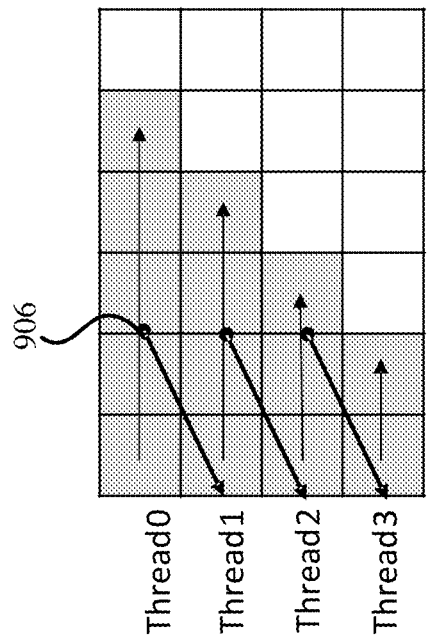
FIG. 9B depicts an example of wavefront coding using the reset list according to some embodiments.
Figure 9A:
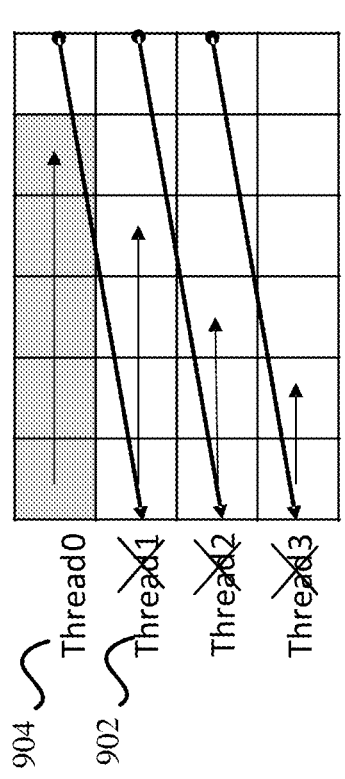
FIG. 9A depicts an example of wavefront coding.

In another example, the existing single historical motion vector predictor list method may be difficult to use when performing wavefront parallel coding, which processes rows of blocks in parallel. FIG. 9A depicts an example of wavefront coding. The coding of a block at a beginning of a row N has to wait for the finish of the blocks of row N−1. That is, thread #1 at 902 cannot start coding a block in row N until the thread #0 at 904 processes the whole block row. However, using the reset list may increase the efficiency of the wavefront coding, allowing the coding to be performed in parallel. FIG. 9B depicts an example of wavefront coding using the reset list according to some embodiments. For example, once the reset list of row N−1 (the row before row N) is filled with motion vectors at 906, thread #1 can start coding row N immediately because some motion vectors for the first N blocks have been stored in the reset list.

Decoder Side Motion Prediction

When decoder motion prediction block 110 receives an encoded bitstream, decoder motion prediction block 110 decodes a current block. To determine the motion vector for a current block, decoder motion prediction block 110 uses the historical motion vector predictor list with the reset list. Once having determined the motion vector and the reference block, decoder motion prediction block 110 uses the residual in the encoded bitstream and the values of the reference block to decode the current block.

Embodiments

In some embodiments, a method includes: selecting, by a computing device, a current block in a frame; determining, by the computing device, whether the current block is in a first set of positions in the frame; when the current block is in the first set of positions: loading, by the computing device, a first set of motion vectors from a first list as historical motion vector predictors, wherein the one or more motion vectors are from one or more blocks in the first set of positions in the frame; and using, by the computing device, the first set of motion vectors to transcode the current block; and when the current block is not in the first set of positions, using, by the computing device, a second set of motion vectors from a second list.

In some embodiments, the first set of positions in the frame comprise N blocks from a left side of the frame.

In some embodiments, the first set of positions in the frame includes a leftmost block from a left side of the frame.

In some embodiments, the one or more blocks comprise a block that neighbors the current block on a top edge of the current block.

In some embodiments, loading the first set of motion vectors from the first list as historical motion vector predictors includes: loading the first set of motion vectors into the second list.

In some embodiments, motion vectors in the second list are used to transcode the current block when the current block is in the first set of positions.

In some embodiments, loading the first set of motion vectors into the second list removes some existing motion vectors in the second list.

In some embodiments, the second list stores historical motion vector predictors from blocks that were sequentially transcoded before the current block.

In some embodiments, the first list is not used when blocks outside of the first set of blocks are transcoded.

In some embodiments, the method further includes: selecting one of the historical motion vector predictors; calculating a difference between the one of the historical motion vector predictors and a motion vector of the current block; including the difference in an encoded bitstream.

In some embodiments, the method further includes: storing a motion vector for the current block in the first list, wherein the motion vector is usable as a historical motion vector predictor for another block in the first set of positions.

In some embodiments, the first list includes motion vectors from blocks in the first set of positions.

In some embodiments, when the current block is in the first set of positions: the current block is transcoded before blocks in a previous row are finished being transcoded.

In some embodiments, a non-transitory computer-readable storage medium has stored thereon computer executable instructions, which when executed by a computing device, cause the computing device to be operable for: selecting a current block in a frame; determining whether the current block is in a first set of positions in the frame; when the current block is in the first set of positions: loading a first set of motion vectors from a first list as historical motion vector predictors, wherein the one or more motion vectors are from one or more blocks in the first set of positions in the frame; and using the first set of motion vectors to transcode the current block; and when the current block is not in the first set of positions, using a second set of motion vectors from a second list.

In some embodiments, the first set of positions in the frame comprise N blocks from a left side of the frame.

In some embodiments, the first set of positions in the frame includes a leftmost block from a left side of the frame.

In some embodiments, the one or more blocks comprise a block that neighbors the current block on a top edge of the current block.

In some embodiments, loading the first set of motion vectors from the first list as historical motion vector predictors includes: loading the first set of motion vectors into the second list.

In some embodiments, the first list is not used when blocks outside of the first set of blocks are transcoded.

In some embodiments, an apparatus includes: one or more computer processors; and a computer-readable storage medium includes instructions for controlling the one or more computer processors to be operable for: selecting a current block in a frame; determining whether the current block is in a first set of positions in the frame; when the current block is in the first set of positions: loading a first set of motion vectors from a first list as historical motion vector predictors, wherein the one or more motion vectors are from one or more blocks in the first set of positions in the frame; and using the first set of motion vectors to transcode the current block; and when the current block is not in the first set of positions, using a second set of motion vectors from a second list.

System

Figure 10:
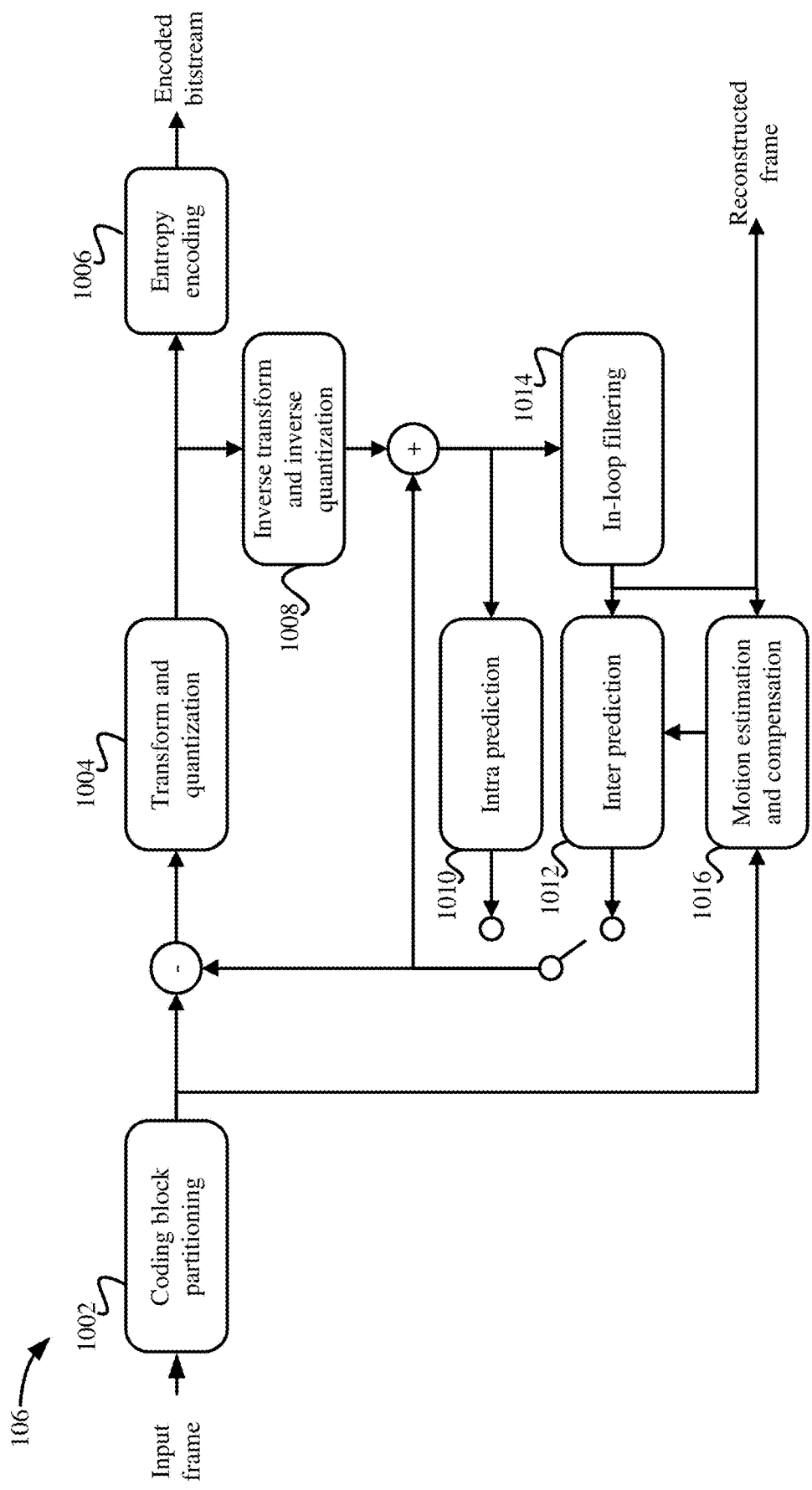
FIG. 10 depicts an example of a transcoding system according to some embodiments.

FIG. 10 depicts an example of a transcoding system according to some embodiments. A video codec framework includes a set of fundamental components: block partitioning, inter and intra prediction, transform and quantization, and entropy coding.

Transcoder 106 receives a frame of a video, which is firstly split into non-overlapping coding blocks for further processing. To cope with different video content characteristics, complex regions will be covered by partitions with smaller sizes, while simple regions will be covered by larger partitions. Multiple block patterns and shapes may be both used together, for example quad-tree pattern, triple-tree pattern, and binary-tree pattern can be all used together, while square blocks and rectangular blocks can also be used together.

Prediction is used to remove the redundancy of a video signal. By subtracting the predicted pixel values from the pixels being processed, the amplitude of a residual signal can be significantly reduced, thus the resulting bitstream size can be reduced. An intra prediction block 1010, which is using reference pixels in the current frame, aims to reduce the spatial redundancy within the frame. An inter prediction block 1012, which is using reference pixels from neighboring frames, attempts to remove the temporal redundancy between frames. A motion estimation and compensation block 1016 may be a sub-module of inter prediction at the transcoder side, which captures the motion trace of objects among adjacent frames and generates reference pixels for inter prediction.

A transform and quantization block 1004 uses the residual pixels after intra or inter prediction. Transform and quantization block 1004 performs a transform operation that represents the residual signal in a frequency domain. Considering the human visual system is more sensitive to low frequency components of video signal than the high frequency components, quantization is designed to further compress the residual signal by reducing the precision on high frequency signals.

To avoid the out-of-sync issue between transcoder 106 and decoder 112, transcoder 106 contains decoding modules to make sure both transcoder 106 and decoder 112 are using identical mathematical processes. Thus, an inverse transform and inverse quantization block 1008 is similar to the same block on the decoder side. Inverse transform and inverse quantization block 1008 reconstructs pixels using the intra and inter prediction.

An in-loop filter 1014 removes any visual artifacts that are introduced by the above-mentioned processes. Various filtering methods are applied on the reconstructed frame in a cascaded way to reduce different artifacts, including but not limited to the blocking artifacts, mosquito artifacts, color banding effects, etc.

An entropy encoding block 1006 may further compress the bitstream using a model-based method. Transcoder 106 transmits the resulting encoded bitstream to decoder 112 over a network or other types of medium.

Figure 11:
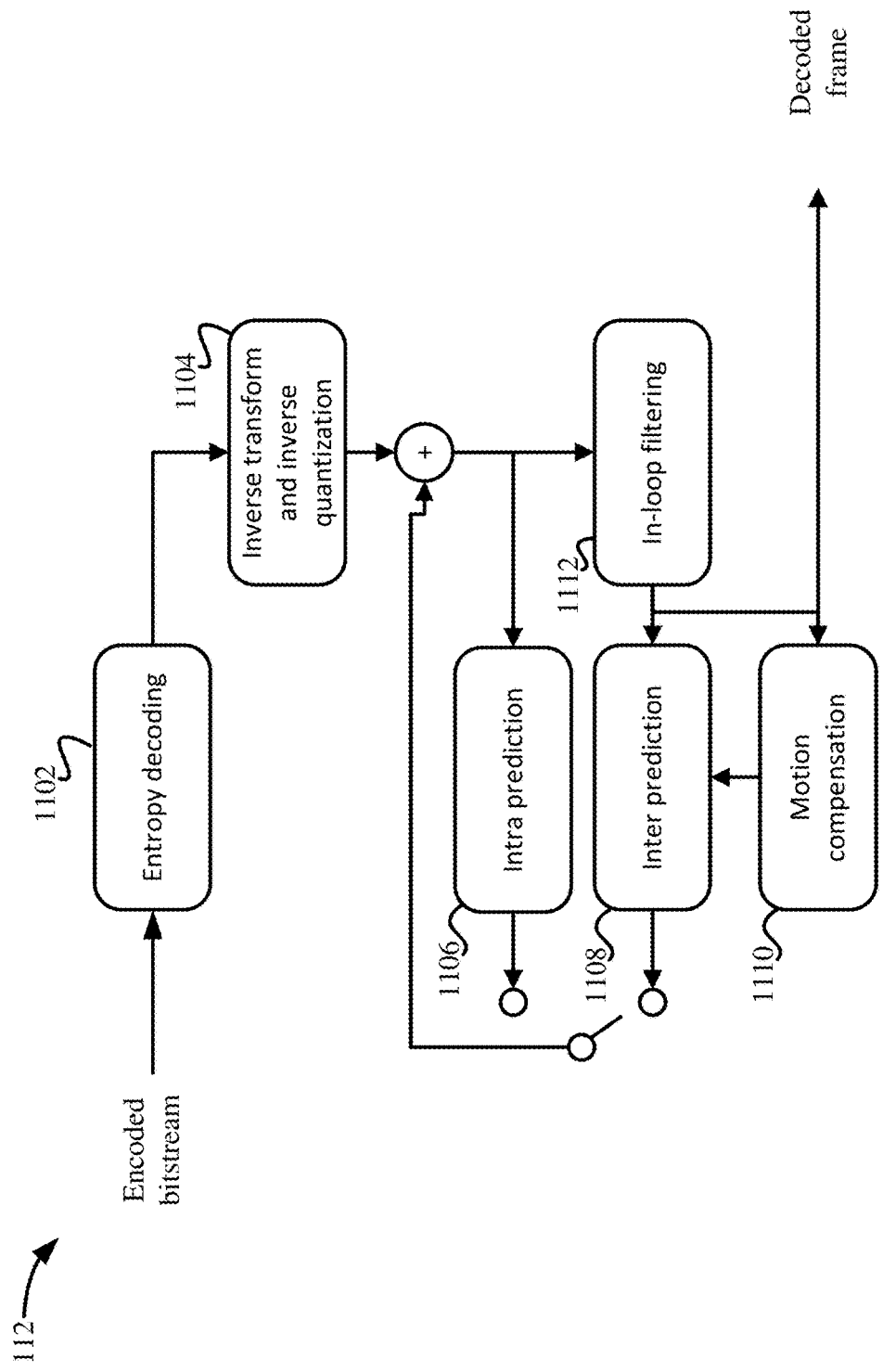
FIG. 11 depicts an example of a decoding system according to some embodiments.

FIG. 11 depicts an example of a decoding system according to some embodiments. Decoder 112 receives the encoded bitstream and inputs it into an entropy decoding block 1102 to recover the information needed for decoding process. As above-mentioned, a decoded frame can be decoded by using an inverse transform and inverse quantization block 1104, an intra prediction block 1106 or inter prediction block 1108, motion compensation block 1110, and in-loop filtering block 1112 in the same way to build a decoded frame.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   maintaining, by a computing device, a first list and a second list, wherein motion vectors from one or more blocks in a first set of positions in a frame are added to the first list, and wherein motion vectors from one or more blocks in the first set of positions and a second set of positions in the frame are added to the second list;
   when a current block is in the first set of positions in the frame:
      loading, by the computing device, a first set of motion vectors from the first list as historical motion vector predictors, wherein the first set of motion vectors are from the one or more blocks in the first set of positions in the frame; and
      using, by the computing device, the first set of motion vectors to transcode the current block; and
      storing, by the computing device, a motion vector for the current block in the first list and the second list;
   when the current block is not in the first set of positions:
      using, by the computing device, a second set of motion vectors from the second list; and
      storing, by the computing device, a motion vector for the current block in the second list while maintaining the motion vectors in the first list.

2. The method of claim 1, wherein the first set of positions in the frame comprise N blocks from a left side of the frame.

3. The method of claim 1, wherein the first set of positions in the frame comprises a leftmost block from a left side of the frame.

4. The method of claim 1, wherein the one or more blocks in the first set of positions comprise a block that neighbors the current block on a top edge of the current block.

5. The method of claim 1, wherein loading the first set of motion vectors from the first list as historical motion vector predictors comprises:
   loading the first set of motion vectors into the second list.

6. The method of claim 5, wherein motion vectors in the second list are used to transcode the current block when the current block is in the first set of positions.

7. The method of claim 5, wherein loading the first set of motion vectors into the second list removes some existing motion vectors in the second list.

8. The method of claim 1, wherein the second list stores historical motion vector predictors from blocks that were sequentially transcoded before the current block.

9. The method of claim 1, wherein the motion vectors from one or more blocks in the first list are not used when blocks outside of the first set of blocks are transcoded.

10. The method of claim 1, further comprising:
   selecting one of the historical motion vector predictors;
   calculating a difference between the one of the historical motion vector predictors and a motion vector of the current block; and
   including the difference in an encoded bitstream.

11. The method of claim 1, further comprising:
   storing a motion vector for the current block in the first list, wherein the motion vector is usable as a historical motion vector predictor for another block in the first set of positions.

12. The method of claim 1, wherein motion vectors from the one or more blocks in the first set of positions are stored in the second list.

13. The method of claim 1, when the current block is in the first set of positions:
   the current block is transcoded before blocks in a previous row are finished being transcoded.

14. A non-transitory computer-readable storage medium having stored thereon computer executable instructions, which when executed by a computing device, cause the computing device to be operable for:
   maintaining a first list and a second list, wherein motion vectors from one or more blocks in a first set of positions in a frame are added to the first list, and wherein motion vectors from one or more blocks in the first set of positions and a second set of positions in the frame are added to the second list;
   when a current block is in the first set of positions in the frame:
      loading a first set of motion vectors from the first list as historical motion vector predictors, wherein the first set of motion vectors are from the one or more blocks in the first set of positions in the frame; and
      using the first set of motion vectors to transcode the current block; and
      storing a motion vector for the current block in the first list and the second list;
   when the current block is not in the first set of positions:
      using a second set of motion vectors from the second list; and
      storing a motion vector for the current block in the second list while maintaining the motion vectors in the first list.

15. The non-transitory computer-readable storage medium of claim 14, wherein the first set of positions in the frame comprise N blocks from a left side of the frame.

16. The non-transitory computer-readable storage medium of claim 14, wherein the first set of positions in the frame comprises a leftmost block from a left side of the frame.

17. The non-transitory computer-readable storage medium of claim 14, wherein the one or more blocks in the first set of positions comprise a block that neighbors the current block on a top edge of the current block.

18. The non-transitory computer-readable storage medium of claim 14, wherein loading the first set of motion vectors from the first list as historical motion vector predictors comprises:
   loading the first set of motion vectors into the second list.

19. The non-transitory computer-readable storage medium of claim 14, wherein the motion vectors from one or more blocks in the first list are not used when blocks outside of the first set of blocks are transcoded.

20. An apparatus comprising:
   one or more computer processors; and
   a computer-readable storage medium comprising instructions for controlling the one or more computer processors to be operable for:
      maintaining a first list and a second list, wherein motion vectors from one or more blocks in a first set of positions in a frame are added to the first list, and wherein motion vectors from one or more blocks in the first set of positions and a second set of positions in the frame are added to the second list;
      when a current block is in the first set of positions in the frame:
         loading a first set of motion vectors from the first list as historical motion vector predictors, wherein the first set of motion vectors are from the one or more blocks in the first set of positions in the frame; and using the first set of motion vectors to transcode the current block; and storing a motion vector for the current block in the first list and the second list;

when the current block is not in the first set of positions:

using a second set of motion vectors from the second list; and storing a motion vector for the current block in the second list while maintaining the motion vectors in the first list.

* * * * *